United States Patent [19]
Verduijn

[11] Patent Number: 5,670,130
[45] Date of Patent: Sep. 23, 1997

[54] ZEOLITE L PREPARATION

[75] Inventor: Johannes P. Verduijn, Spijkenisse, Netherlands

[73] Assignee: Exxon Chemical Patents Inc. (ECPI), Houston, Tex.

[21] Appl. No.: 374,405

[22] Filed: Jan. 17, 1995

Related U.S. Application Data

[63] Continuation of Ser. No. 81,841, Jun. 23, 1993, abandoned, which is a continuation of Ser. No. 391,765, Aug. 9, 1989, abandoned.

[51] Int. Cl.$^6$ .................................................. C01B 39/32
[52] U.S. Cl. .................. 423/700; 423/716; 423/DIG. 28
[58] Field of Search ........................... 423/700, 713, 423/716, DIG. 28; 502/60

[56] References Cited

U.S. PATENT DOCUMENTS

| | | | |
|---|---|---|---|
| 3,216,789 | 11/1965 | Breck et al. | 423/712 |
| 3,867,512 | 2/1975 | Young | 423/710 |
| 4,530,824 | 7/1985 | Arika et al. | 423/700 |
| 4,544,539 | 10/1985 | Wortel | 423/718 |
| 4,657,749 | 4/1987 | Vaughan | 423/710 |
| 4,701,315 | 10/1987 | Wortel | 423/718 |
| 4,894,214 | 1/1990 | Verduijn et al. | 423/700 |
| 5,242,675 | 9/1993 | Verduijn | 423/700 |
| 5,328,675 | 7/1994 | Vaughan et al. | 423/DIG. 28 |
| 5,472,681 | 12/1995 | Verduijn | 423/713 |
| 5,491,119 | 2/1996 | Verduijn | 423/716 |

*Primary Examiner*—Mark L. Bell
*Assistant Examiner*—David Sample
*Attorney, Agent, or Firm*—Edward F. Sherer

[57] ABSTRACT

Zeolite L containing caesium having enhanced catalytic properties is prepared by a process in which said zeolite L is crystallized from a synthesis mixture with a molar composition (expressed as oxides) of:

| | |
|---|---|
| $K_2O/SiO_2$ | 0.22 to 0.30 |
| $K_2O/Cs_2O$ | 5 to 12 |
| $H_2O/K_2O$ | 50 to 90 |
| and | |
| $SiO_2/Al_2O_3$ | 6.0 to 7.0 | and containing 0.5 to 20 ppm (by weight) of divalent metal cations, e.g. Mg ions. The zeolite L can form part of a dehydrocyclization and/or isomerisation catalyst.

7 Claims, No Drawings

ZEOLITE L PREPARATION

This is a continuation of application Ser. No. 08/081,841, filed Jun. 23, 1993, now abandoned, which is a continuation of Ser. No. 07/391,765, filed Aug. 9, 1989, now abandoned.

This invention relates to the preparation of zeolite L and its use in catalysis, particularly for aromatisation.

Zeolite L has been known for some time as an adsorbant, and in U.S. Pat. No. 3,216,789 is described as an aluminosilicate of the formula:

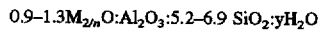

$0.9-1.3 M_{2/n}O:Al_2O_3:5.2-6.9\ SiO_2:yH_2O$ (where M is an exchangeable cation of valency n and y is from 0 to 9) having a characteristic X-ray diffraction pattern. The preparation of zeolite L is described in U.S. Pat. No. 3,216,789, EP-A-167755, EP-A-142355, EP-A-142347, EP-A-142349, EP-A-109199, PL-A-72149, U.S. Pat. No. 3,867,512, and SU-548567.

EP-A-96479 describes and claims zeolite L having a characteristic morphology and size, which is particularly valuable for use as a catalyst base in hydrocarbon conversions such as aromatisation, and comprising crystallites in the form of cylinders with a mean diameter of at least 0.1 micron, preferably at least 0.5 micron.

EP-A-96479 describes a synthesis of zeolite L which is conducted so that the amount of the contaminant zeolite W, which is know to grow in such a system as a competitive phase, is minimised. A preferred synthesis gel described in EP-A-96479 has the following mole ratios:

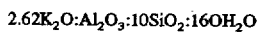

$2.62 K_2O:Al_2O_3:10SiO_2:160H_2O$ and it is discussed how this gel may be varied by changing the molar amount of one component within the following ranges:

$K_2O$: 2.4–3.0 moles $Al_2O_3$: 0.6–1.3 moles $SiO_2$: 8–12 moles $H_2O$: 120–240 moles EP-A-142353, EP-A-142354 and EP-A-185519 describe developments of this process for forming cylindrical zeolite L.

Zeolite L may be used as a catalyst base e.g. in dehydrocyclisation or aromatisation reactions. U.S. Pat. No. 4104320 discloses dehydrocyclisation of aliphatic compounds in the presence of hydrogen using a catalyst comprising zeolite L and a group VIII metal. The particular zeolite disclosed in EP-A-96479 is remarkably effective in such aromatisation reactions being capable of forming catalysts which have extended lifetime.

It has been found that the potassium form of zeolite L herein identified as zeolite KL shows enhanced properties as an aromatisation catalyst if it also contains some caesium (hereinafter identified as zeolite KCsL). However attempts to replace some of the potassium ions by caesium ions in the preparation of zeolite KL have not been very successful in the past as the presence of caesium ions favours the formation of pollucite rather than zeolite L. One method of incorporating caesium in the zeolite KL without any substantial formation of pollucite is described in EP-A-0280513.

It has now been found that by careful adjustment of the $SiO_2/Al_2O_3$ and $K_2O/SiO_2$ mole ratios in that process aluminium-rich forms of zeolite KL are obtained with a "perfect" cylindrical morphology. By the word "perfect" we mean that at least 80% of basal planes are microscopically flat to within about 200 Å and do not exhibit the step growths thereon. They also have reduced electronegativity compared with the products retained according to the process of EP-A-0280513 and this means enhanced catalytic properties for zeolite KL in converting light naphtha into benzene.

According to this invention zeolite L containing caesium is obtained by a process in which said zeolite L is crystallised from a synthesis mixture with a molar composition (expressed as oxides) of:

| | |
|---|---|
| $K_2O/SiO_2$ | 0.22 to 0.30 |
| $K_2O/Cs_2O$ | 5 to 12 |
| $H_2O/K_2O$ | 50 to 90 |
| and | |
| $SiO_2/Al_2O_3$ | 6.0 to 7.0 | and containing at least 0.5 ppm (by weight) of divalent metal cations, e.g. magnesium ions.

It was surprisingly found that the careful adjustment in the $K_2O/SiO_2$ and $SiO_2/Al_2O_3$ mole ratios in the synthesis mixture enabled one to obtain a highly pure zeolite L containing potassium and caesium which has a significantly low $SiO_2/Al_2O_3$ mole ratio of well below 5 without affecting the "perfect" morphology of the crystals.

The synthesis mixture is conveniently derived from the admixture of two solutions—Solution A and Solution B.

Solution A can be termed a potassium—caesium aluminate solution and Solution B can be termed a silicate solution which may contain divalent metal cations.

The source of potassium is usually potassium hydroxide, e.g. as pellets.

The caesium can be introduced as the hydroxide or as a salt, e.g. a halide such as CsCl.

The source of aluminium may be an alumina introduced into the reaction medium as, for example, $Al_2O_3.3H_2O$, previously dissolved in alkali. However, it is also possible to introduce aluminium in the form of the metal, which is dissolved in alkali.

Thus Solution A may conveniently be formed from KOH or $K_2O$, $CsOH.H_2O$ or CsX, $Al(OH)_3$ and water where X is a halogen such as chlorine or a nitrate.

Solution A can be prepared by dissolving aluminium hydroxide in water by boiling and after cooling to ambient temperature, the weight loss of water due to evaporation may be corrected.

The source of silicon for Solution B is generally silica, and this is usually most conveniently in the form of a colloidal suspension of silica such as Ludox HS 40 available from E. I. Dupont de Nemours and Co. Colloidal silica sols are preferred since they result in less contaminating phases. However, other forms such as silicates may be used.

The divalent metal cations may be added at any stage of the preparation of the synthesis mixture.

The divalent metal may be a Group Ib metal such as copper, a Group II metal, for example magnesium, calcium, barium or zinc, Group IV metal such as lead, or Group VI, VII or VIII metals such as chromium, manganese, iron, cobalt or nickel. These metals may be introduced in the form of any convenient compound, for example as an oxide, hydroxide, nitrate or sulphate.

Thus Solution B may be formed from silica, a divalent metal salt, e.g. $Mg(NO_3)_2$ and water.

Solution B can be conveniently formed from Ludox HS-40($SiO_2$), $Mg(NO_3)_2$ and water.

The relative quantities of Solutions A and B are such that the mole ratio of $SiO_2$ to $Al_2O_3$ is preferably between 6.0 and 6.7, e.g. about 6.3.

The overall synthesis mixture, e.g. obtained by transferring Solution A to Solution B and mixing the combined solutions, according to the invention has the molar composition (expressed as oxides) of:

| | |
|---|---|
| $K_2O/SiO_2$ | 0.22 to 0.30 |
| $K_2O/Cs_2O$ | 5 to 12 |
| $H_2O/K_2O$ | 50 to 90 |
| and | |
| $SiO_2/Al_2O_3$ | 6.0 to 7.0 | and containing at least 0.5 ppm (by weight) of divalent metal cations. Optionally these ratios are:

| | | |
|---|---|---|
| $K_2O/SiO_2$ | 0.23 to 0.30 | preferably about 0.24 |
| $K_2O/Cs_2O$ | 8 to 11 | preferably about 10 |
| $H_2O/K_2O$ | 50 to 80 | preferably about 60 |
| and | | |
| $SiO_2/Al_2O_3$ | 6.1 to 6.5 | preferably about 6.3 | and containing 0.5 to 20, e.g. about 15 ppm (by weight) of Mg or Co cations or 100 to 250 ppm of Cu, Ca, Ba, Zn, Pb, Mn, Fe or Ni cations.

After mixing Solutions A and B for a period of time, e.g. about 4 minutes, to homogenise the mixture, the mixture is crystallised.

The crystallisation is generally carried out in a sealed autoclave and thus at autogenous pressure. It is generally inconvenient, although possible, to employ higher pressures. Lower pressure will require longer crystallisation times.

Crystallisation time is related to the crystallisation temperature. The crystallisation is usually carried out at a temperature of at least 130° C., preferably in the region of 150° C. and at this temperature the crystallisation time may be from 16 to 96 hours, typically from 40 to 80 hours. Lower temperatures may require much longer times to achieve good yield of the desired product, whereas times of less than 16 hours are possible when higher temperatures are used. A time of 60 to 70 hours is typical for a temperature of about 150° C. When the alkalinity of the synthesis mixtures are low, e.g. $K_2O/SiO_2$ molar ratios between 0.22 and 0.24, which could give rise to the formation of crystalline contaminants such as zeolite W, a two-stage crystallisation technique may be used, e.g. crystallisation at 100°–125° C. during 16–24 hrs followed by crystallisation at 150°–170° C. during 16–96 hrs.

Following the preparation as described above the zeolite KCsL containing caesium may be separated, washed and dried. The washing may be to a pH of more than 7, e.g. 9 to 11. Drying may be at a temperature of above 120° C., e.g. about 150° C. for about 16 hours.

Scanning electron micrographs (SEM) of the products of the invention show that they consist of almost perfect cylindrical crystals with a length of between 0.4 and 0.8 micrometer and with a diameter of between 0.2 and 0.5 micrometers and no amorphous gel particles could be seen.

The zeolites formed in the process of the invention are preferably aluminosilicates and are described herein in terms of aluminosilicates, though other elemental substitutions are possible, for example aluminium may be substituted by gallium, boron, iron and similar di- or trivalent elements capable of existing in tetrahedral coordination, and silicon may be substituted by elements such as germanin or phosphorus.

The invention provides aluminium-rich, caesium containing zeolite L comprising the following molar ratios (expressed as oxides): $(0.9-1.3)$ $M'_2O:Al_2O_3:<5SiO_2:yH_2O$ wherein M' represents a combination of potassium and caesium cation and y is from 0 to 9. The zeolite L will also generally contain small amounts of the divalent metal cations in the structure. The $SiO_2/Al_2O_3$ ratio of the product will usually be from 4.0 to 5.0, e.g. 4.3 to 4.5. The invention enables such zeolite L to be prepared with a "perfect" cylindrical morphology (as defined hereinbefore).

The zeolite KCsL formed by the invention may provide extended catalyst life when used as catalyst bases for aromatisation catalysts.

The zeolite KCsL prepared by the invention may be used as a catalyst base and may be used in combination with a catalytically active metal in a wide variety of catalytic reactions. It is especially suited to catalytic applications where a low acid site strength is advantageous such as aromatisation.

The catalytically-active metal(s) may be, for example, a Group VIII metal such as platinum, or tin or germanium as described in U.S. Pat. No. 4,104,320, or a combination of platinum and rhenium as described in GB-A-2004764 or BE-A-888365. In the latter case, the catalyst may for appropriate circumstances also incorporate halogen as described in U.S. Pat. No. 4165276, silver as described in U.S. Pat. Nos. 4,295,959 and 4,206,040, cadmium as described in 4,295,960 and 4,231,897 or sulphur as described in GB-A-1600927.

A particularly advantageous catalyst composition incorporates from 0.1 to 6.0 wt. %, (based on the total weight of the composition), preferably from 0.1 to 1.5 wt. % platinum or palladium, since this gives excellent results in aromatisation. From 0.4 to 1.2 wt. % platinum is particularly preferred. Accordingly the invention provides a catalyst comprising the zeolite and a catalytically-active metal.

It may also be useful to incorporate into the catalyst of the invention one or more materials substantially inert under the conditions in which the catalyst is to be employed to act as a binder. Such binders may also act to improve the resistance of the catalyst to temperature, pressure and attrition.

The zeolite KCsL of the invention may be used in a process for the conversion of a hydrocarbon feed in which the feed is contacted with a catalyst as described above under appropriate conditions to bring about the desired conversion. They may, for example, be useful in reactions involving aromatisation and/or dehydrocyclisation and/or isomerisation and/or dehydrogenation reaction. They are particularly useful in a process for the dehydrocyclisation and/or isomerisation of aliphatic hydrocarbons in which the hydrocarbons are contacted at a temperature of from 370° to 600° C., preferably 430° to 550° C., with a catalyst comprising zeolite L of the invention, preferably having at least 90% of the cations as potassium ions, 4 and preferably incorporating at least one Group VIII metal having dehydrogenating activity, so as to convert at least part of the aliphatic hydrocarbons into aromatic hydrocarbons.

The aliphatic hydrocarbons may be straight or branched chain acyclic hydrocarbons, and particularly paraffins such as hexane, although mixtures of hydrocarbons may also be used such as paraffin fractions containing a range of alkanes possibly with minor amounts of other hydrocarbons. Cycloaliphatic hydrocarbon such as methylcyclopentane may also be used. In a preferred embodiment the feed to a process for preparing aromatic hydrocarbons and particularly benzene comprises hexanes. The temperature of the catalytic reaction may be from 370° to 600° C., preferably 430° to 550° C. and preferably pressures in excess of atmospheric are used, for example up to 2000 KPa, more preferably 500 to 1000 KPa. Hydrogen is employed in the formation of aromatic hydrocarbons preferably with a hydrogen to feed ratio of less than 10.

The process is preferably otherwise carried out in the manner described in U.S. Pat. No. 4,104,320, BE-A-888365, EP-A-0040119, EP-A-0142351, EP-A-0145289 or EP-A-0142352.

The invention is now described with reference to the following Examples.

EXAMPLE 1

A synthesis mixture with a molar composition of:

2.19 $K_2O$/0.40 $Cs_2O$/1.50 $Al_2O_3$/10 $SiO_2$/162 $H_2O$ and containing 12 wt ppm of $Mg^{2+}$ was prepared as follows:

Solution A: Potassium—Caesium Aluminate solution: (weight of reactants in grams)

KOH pellets (86.8% purity): 28.25
CsOH.$H_2O$ powder (laboratory grade purity): 13.51
Al(OH)$_3$ powder (purity 98.6%): 23.69
$H_2O$: 74.85

Solution B: Silicate solution containing $Mg^{2+}$:

Ludox HS-40 ($SiO_2$): 150.28
Mg(NO$_3$)$_2$—stock solution: 100.00
$H_2O$: 12.24

The aluminium hydroxide was dissolved by boiling until clear and after cooling to ambient temperature the weight loss due to evaporation of the water was corrected. The Mg(NO3)$_2$—stock solution, containing 0.048 mg $Mg^{2+}$/gram, was mixed with the Ludox together with the water in a mixer. This was achieved by quantitatively transferring solution A to the solution B and the combined solutions were mixed for 3 minutes to homogenize the mixture. Of this mixture 348.78 g. was transferred to a 300 ml stainless steel autoclave and was aged at autogenous pressure for 68 hrs at 150° C. without stirring. The resulting product was washed with demineralised water until the pM of the wash water was 10.1. The product was dried overnight at 150° C. The amount of product obtained was 73.0 g. This corresponds with a product yield, $$\left( \frac{\text{weight of dry product}}{\text{weight of gel}} \times 100\% \right)$$

based on the weight of the gel, of 20.9 wt %.

A similar synthesis mixture was prepared without $Mg^{2+}$ and crystallized/recovered in the same way as described above. The product yield was 21.7 wt %. Both products were characterised by XRD, SEM and TGA. The results are given below:

Synthesis with $Mg^{2+}$:
XRD: pure zeolite-L, crystallinity 40% vs standard.
SEM: cylindrical crystallites with a length between 0.4 and 0.8 microns and with a diameter between 0.2 and 0.4 microns, some Poilucite present.
TGA: toluene adsorption capacity: 5.5 wt %.

Synthesis without $Mg^{2+}$:
XRD: mixture of zeolite-W and Poilucite, traces of L present.
SEM: −15 micron Poilucite agglomerates.
TGA: toluene adsorption capacity: 0.4 wt %.

The zeolite KCsL product synthesized with the presence of $Mg^{2+}$ was submitted for elemental analysis. The results were: Al:10.0 wt %, K: 10.5 wt %, Cs 10.2 wt %, Si: 23.3 wt %. The chemical composition of the zeolite KCsL product calculated from the elemental analysis was: 0.73 $K_2O$/0.21 $Cs_2O$/$Al_2O_3$/4.5 $SiO_2$. The ratio ($K_2O$+$Cs_2O$)/$Al_2O_3$ was 0.94, which is close to unity. From this composition can be seen that this zeolite KCsL product is significantly more aluminous than "conventional" cylindrical KL. However, it did suffer from the presence of Poilucite and is not within the scope of the invention.

EXAMPLE 2

In this Example a series of experiments were carried out to determine the extent to which:

alumina concentration in the gel could be increased,
the $K_2O$/$SiO_2$ ratio of the gel could be reduced, and by how far the $SiO_2$/$Al_2O_3$ ratio of the gel could be reduced without triggering excessive amounts of contaminants. The Cs-sources used in these syntheses were respectively CsCl and CsNO$_3$. The synthesis gels were crystallized in 300 ml stainless steel autoclaves at 150° C. during 68 hrs.

The gel compositions and product characteristics of the resulting products are given in Tables 1 and 2 below:

TABLE 1

| | Gel Composition | | | | | | | |
|---|---|---|---|---|---|---|---|---|
| Run No | $K_2O$ | $Cs_2O$ | Cs | $Al_2O_3$ | $SiO_2$ | $H_2O$ | $\frac{SiO_2}{Al_2O_3}$ ratio | ppm Mg2+ |
| 2 | 2.60 | 0.40 | 0.80 | 1.50 | 10 | 160 | 6.7 | 15 |
| 3 | 2.60 | 0.25 | 0.50 | 1.60 | 10 | 160 | 6.3 | 15 |
| 4 | 2.60 | 0.25 | 0.50 | 1.50 | 9.2 | 150 | 6.1 | 15 |
| 5 | 2.60 | 0.25 | 0.50 | 1.70 | 10 | 160 | 5.9 | 15 |
| 6 | 2.60 | 0.40 | 0.80a) | 1.50 | 10 | 160 | 6.7 | 15 | a) Cs source: CsNo$_3$

TABLE 2

| | Product Characteristics | | | | | | |
|---|---|---|---|---|---|---|---|
| | XRD | | SEM | | | | TGA |
| Run No | crystallinity vs standard KL | contaminants | shape | crystallite length | diam. | contaminants | wt % tol. cap. | Prod. yield wt % |
| 2 | 48 | nil | cyl. | 0.2–0.4 | 0.2–0.3 | trace Polluc. | 6.7 | 20.8 |
| 3 | 64 | nil | cyl. | 0.3–0.5 | 0.2–0.3 | nil | 9.2 | 21.6 |

TABLE 2-continued

| | Product Characteristics | | | | | | |
|---|---|---|---|---|---|---|---|
| | XRD | | | | | TGA | |
| | crystal- | | | SEM | | | |
| Run No | linity vs standard KL | con- tami- nants | crystallite shape | length | diam. | con- tami- nants | wt % tol. cap. | Prod. yield wt % |
| 4 | 61 | nil | cyl. | 0.2–0.4 | 0.1–0.3 | trace Polluc. | 8.9 | 21.0 |
| 5 | 30 | W/Polluc. | W/Pollucite crystals | | | Polluc. | 4.4 | 22.6 |
| 6 | 57 | nil | cyl. | 0.2–0.4 | 0.1–0.3 | trace Polluc. | 8.4 | 20.8 |

EXAMPLE 3

The procedure of Example 1 was repeated in 8 further runs and the experimental conditions and results obtained are shown in Table 3.

To confirm this, the product of run 3 was analyzed for its chemical composition. The composition, calculated from the elemental analysis, was: $0.85 K_2O/0.10 Cs_2O/Al_2O_3/4.3 SiO_2$. This analysis indeed confirms that the

TABLE 3

KCsL SYNTHESIS FROM ALUMINA-RICH SYNTHESIS GELS

| | Gel Composition(c) | | | | | | Molar Ratios | | | | Product Characteristics | | | | | | |
|---|---|---|---|---|---|---|---|---|---|---|---|---|---|---|---|---|---|
| | | | | | | | | | | | XRD | | SEM | | | | pro- |
| | | | | | | ppm M$^{2+}$ | | | | | % cryst stan- | | Crystallite | | | Con- | duct |
| Run No. | K$_2$O | Cs$_2$O | Al$_2$O$_3$ | SiO$_2$ moles | H$_2$O | (b) | $\frac{K_2O}{SiO_2}$ | $\frac{K_2O}{Cs_2O}$ | $\frac{H_2O}{K_2O}$ | $\frac{SiO_2}{Al_2O_3}$ | dard vs KL | Con- tami- nants | shape | length microns | dia | tami- nants | yield % |
| 7 | 2.60 | 0.25 | 1.60 | 9.0 | 152 | 15 | 0.288 | 10.4 | 59 | 5.6 | <5 | mainly W | | N.A (not available) | | | N.A |
| 8 | 3.00 | 0.25ᵃ | 1.70 | 10 | 161 | 15 | 0.300 | 12 | 54 | 5.9 | <5 | mainly W | | N.A | | | N.A |
| 9ˣ | 2.19 | 0.40ᵃ | 1.50 | 10 | 160 | 12 | 0.219 | 5.5 | 73 | 6.7 | 32 | W/Polluc. | | Zeolite W/Polluc. crystals coated with zeolite L | | | 21.4 |
| 10 | 2.19 | 0.40 | 1.50 | 10 | 161 | 15 | 0.219 | 5.5 | 74 | 6.7 | <5 | minly W | | W and Polluc. | | | 22.4 |
| 11 | 2.35 | 0.25 | 1.50 | 10 | 161 | 15 | 0.235 | 9.4 | 69 | 6.7 | 47 | trace W | Cyl | 0.2–0.5 | 0.1–0.3 | | 20.9 |
| 12 | 2.35 | 0.25ᵃ | 1.50 | 10 | 161 | 15 | 0.235 | 9.4 | 69 | 6.7 | 64 | nil | Cyl | 0.2–0.5 | 0.1–0.3 | nil | 20.6 |
| 13 | 2.35 | 0.35ᵃ | 1.50 | 10 | 161 | 215ᵇ | 0.235 | 6.7 | 69 | 6.7 | 63 | nil | Cyl | 0.1–0.3 | 0.05–0.2 | nil | 20.2 |
| 14 | 2.35 | 0.25ᵃ | 1.60 | 10 | 162 | 15 | 0.235 | 9.4 | 69 | 6.3 | 63 | nil | Cyl | 0.2–0.5 | 0.1–0.4 | nil | 21.6 | x duplication Run No. 1 (Example 1)
a: Cs-source: Cs OH.H$_2$O
b: M$^{2+}$-source: Ba(OH)$_2$.8 H$_2$O, in all other runs Mg$^{2+}$ as Mg (NO$_3$)$_2$.6 H$_2$O
c: Runs 8–12 crystallisation: 68 hrs at 150° C., 300 ml, stainless steel autoclave
Run 13 crystallisation: 20 hrs at 125° C. + 56 hrs at 160° C., 300 ml stainless steel autoclave
Run 14 crystallisation: 24 hrs at 125° C. + 56 hrs at 150° C., 300 ml stainless steal autoclave From these Tables 1,2 and 3 can be seen that:

The formation of contaminants starts when the Al$_2$O$_3$ concentration in the gel is increased from 1.50 to 1.70 moles/10 moles of SiO$_2$, this corresponds with a SiO$_2$/Al$_2$O$_3$ ratio in the gel of 5.9 (run 5).

When the SiO$_2$ concentration in the gel is reduced from 10 to 9.2, corresponding with a SiO$_2$/Al$_2$O$_3$ ratio in the gel of 6.1, pure zeolite KCsL is obtained (run 4).

When the alkalinity of the gel (K$_2$O/SiO$_2$ ratio) is reduced from 0.235 to 0.219 the product consists mainly of zeolite-W and Poilucite.

Increasing the Al$_2$O$_3$ concentration in the syntheses gel (at constant K$_2$O/SiO$_2$ ratio) increases the product yield and this could be an indication that the product of run 3 is more aluminous than those of runs 1,2 and 6.

product of run 3 is more aluminous than that of run 1 (Example 1) (SiO$_2$/Al$_2$O$_3$ ratio 4.3 versus 4.5).

It can be seen that runs 2,3,4,6,11,12,13 and 14 are within the scope of the invention but that runs 5,7,8,9 and 10 are outside the scope of the invention.

I claim:

1. A process for the preparation of a zeolite L substantially free of pollucite and comprising cylindrical crystallites having basal planes wherein at least 80% of the basal planes are microscopically flat to within about 200 Å and do not exhibit spiral step growths thereon and containing cesium in which said zeolite L is crystallized from a synthesis mixture with a molar composition (expressed as oxides) of:

| | |
|---|---|
| K$_2$O/SiO$_2$ | 0.22 to 0.30 |
| K$_2$O/Cs$_2$O | 5 to 12 |
| H$_2$O/K$_2$O | 50 to 90 |
| and | |
| SiO$_2$/Al$_2$O$_3$ | 6.0 to 6.7 | and containing at least 0.5 ppm (by weight) of divalent metal cations.

2. A process according to claim 1 wherein the synthesis mixture has a molar composition (expressed as oxides) of:

| | |
|---|---|
| K$_2$O/SiO$_2$ | 0.23 to 0.30 |
| K$_2$O/Cs$_2$O | 8 to 11 |
| H$_2$O/K$_2$O | 50 to 80 |
| and | |
| SiO$_2$/Al$_2$O$_3$ | 6.1 to 6.5 | and containing 0.5 to 20 ppm (by weight) of Mg or Co cations or 100 to 250 ppm of Cu, Ca, Ba, Zn, Pb, Mn, Fe or Ni cations.

3. A process according to claim 1 wherein the synthesis mixture is obtained from the admixture of two solutions, Solution A comprising (1) KOH or K$_2$O, (2) CsOH.H$_2$O or CsX where X is a halogen or nitrate, (3) Al(OH)$_3$ and (4) water and Solution B comprising (1) silica, (2) a divalent metal salt and (3) water.

4. A process according to claim 1 wherein the temperature of crystallisation is at least 130° C.

5. A zeolite L substantially free of pollucite and comprising cylindrical crystallites having basal planes wherein at least 80% of the basal planes are microscopically flat to within about 200 Å and do not exhibit spiral step growths thereon, said zeolite L having the formula expressed as molar ratio of the oxides:

0.9–1.3 M'$_2$O:Al$_2$O$_3$:<5.0SiO$_2$:yH$_2$O where M' represents mixed K and Cs cations and y is from 0 to 9.

6. A zeolite L as claimed in claim 5 wherein the molar ratio of SiO$_2$/Al$_2$O$_3$ is from 4.3 to 4.5.

7. A zeolite as claimed in claim 5 wherein the molar ratio of SiO$_2$/Al$_2$O$_3$ is at least 4.0.

* * * * *